United States Patent
Hwang

(10) Patent No.: US 7,397,618 B2
(45) Date of Patent: Jul. 8, 2008

(54) LENS DEVICE

(75) Inventor: Sheng-Chieh Hwang, Changhua (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/881,935

(22) Filed: Jul. 30, 2007

(65) Prior Publication Data
US 2008/0030863 A1    Feb. 7, 2008

(30) Foreign Application Priority Data
Aug. 3, 2006   (TW) .............................. 95128473 A

(51) Int. Cl.
G02B 7/02     (2006.01)
G02B 15/14    (2006.01)

(52) U.S. Cl. .................. 359/819; 359/703; 359/704

(58) Field of Classification Search ......... 359/819–824, 359/826, 703, 704
See application file for complete search history.

(56) References Cited

U.S. PATENT DOCUMENTS 6,778,335 B2 *   8/2004   Takanashi ................... 359/704

* cited by examiner

Primary Examiner—Mohammed Hasan
(74) Attorney, Agent, or Firm—Trop, Pruner & Hu, P.C.

(57) ABSTRACT

A lens device includes a focus lens unit mounted movably to a base, first and second lens units mounted in a main barrel, and a resilient light blocking sheet connected to the focus driving unit. The first and second lens units are movable in the in the main barrel along the axis between an extended position, where the first and second lens units cooperatively define a second gap therebetween, through which light passes and is reflected by the main barrel toward a first gap between the focus lens unit and the focus driving unit, and where the light blocking sheet spans the first gap so as to block passage of the light through the first gap, and a retracted position, where the second lens unit extends into the first gap and causes the light blocking sheet to flex.

9 Claims, 7 Drawing Sheets

LENS DEVICE

CROSS-REFERENCE TO RELATED APPLICATION

This application claims priority of Taiwanese Application No. 095128473, filed on Aug. 3, 2006.

BACKGROUND OF THE INVENTION

1. Field of the Invention

The invention relates to a lens device, more particularly to a lens device capable of blocking unnecessary light.

2. Description of the Related Art

As shown in FIGS. 1 and 2, a conventional lens device 10 is zoom adjustable along an axis (L), and is adapted for use with a digital camera. The conventional lens device 10 includes a base 11, a focus lens unit 12, a focus driving unit 13, a main barrel 14, a first cam barrel 15, a first lens unit 16, and a second lens unit 17. The digital camera includes an image sensing component 100 disposed on the base 11 and aligned with the focus lens unit 12 along the axis (L).

The focus lens unit 12 is mounted movably to the base 11. The focus driving 13 is mounted to the base 11 and is operable to drive the focus lens unit 12 to move along the axis (L). The main barrel 14 is slidably connected to a second cam barrel 153 mounted to the base 11, and has an inner annular surface 141, three first guide slots 142 (only one is shown) extending parallel to the axis (L), and three second guide slots 143 (only one is shown) extending parallel to the axis (L). The first cam barrel 15 is sleeved rotatably on the main barrel 14, and is formed with three first cam slots 151 (only one is shown) and three second cam slots 152 (only one is shown).

The first lens unit 16 is sleeved in the main barrel 14, and includes a first lens frame 160, a plurality of first lenses 161 secured to the first lens frame 160, and three first connecting pins 162 (only one is shown) extending respectively through the first guide slots 142 and retained slidably and respectively in the first cam slots 151. The second lens unit 17 is sleeved in the main barrel 14, and includes a second lens frame 170, a plurality of second lenses 171 secured to the second lens frame 170, and three second connecting pins 172 (only one is shown) extending respectively through the second guide slots 143 and retained slidably and respectively in the second cam slots 152. The image sensing component 100 of the digital camera is aligned with the first and second lenses 161, 171 along the axis (L).

The first cam barrel 15 can be driven to move rotatably along the axis (L) by a motor 191 and a driving unit 192 through a rotary drive barrel 193. The main barrel 14 that is sleeved inside the second cam barrel 153 will then be driven to move along the axis (L) by the first cam barrel 15. Since the first connecting pins 162 of the first lens unit 16 are retained respectively in the first cam slots 151 in the first cam barrel 15, and since the second connecting pins 172 of the second lens unit 17 are retained respectively in the second cam slots 152 in the first cam barrel 15, the first and second lenses 161, 171 will also move along the axis (L), thereby resulting in zoom adjustment.

However, when the first and second lens units 151, 152 move to an extended position (see FIG. 1), where the second lens unit 17 moves in a direction away from the focus lens unit 12, the focus lens unit 12 and the focus driving unit 13 will cooperatively define a first gap 18 therebetween, and the first and second lens units 16, 17 will cooperatively define a second gap 181. Therefore, ambient light (as indicated by the arrows in FIG. 1) can pass through the first lenses 161 of the first lens unit 16 and the second gap 181, be reflected by the inner annular surface 141 of the main barrel 14, and finally reach the image sensing component 100 via the first gap 18, thereby resulting in poor image quality.

SUMMARY OF THE INVENTION

Therefore, the object of the present invention is to provide a lens device capable of overcoming the above-mentioned drawback of the prior art.

Accordingly, a lens device of the present invention comprises a base, a focus lens unit mounted movably to the base, a focus driving unit, a main barrel, first and second lens units, and a light blocking sheet. The focus driving unit is mounted to the base, is coupled to the focus lens unit, is operable to drive the focus lens unit to move along an axis, and cooperates with the focus lens unit to form a first gap therebetween.

The main barrel is connected to the base and has an inner annular surface. The first lens unit is disposed movably in the main barrel, and includes a first lens frame and a first lens that is secured in the first lens frame and that corresponds in position to the focus lens unit.

The second lens unit is disposed movably in the main barrel, and includes a second lens frame and a second lens that is secured in the second lens frame and that corresponds in position to the first lens. The first and second lens units are movable in the main barrel along the axis between an extended position, where the first and second lens units cooperatively define a second gap therebetween, through which light passes and is reflected by the inner annular surface of the main barrel toward the first gap, and a retracted position, where the second lens frame extends into the first gap. The light blocking sheet is made of a resilient material, and has a connecting portion that is connected to the focus driving unit, and a blocking portion that is disposed to span the first gap when the first and second lens units are at the extended position so as to block passage of the light reflected by the inner annular surface of the main barrel through the first gap, and that is capable of flexing when pressed by the second lens frame during movement of the first and second lens units to the retracted position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
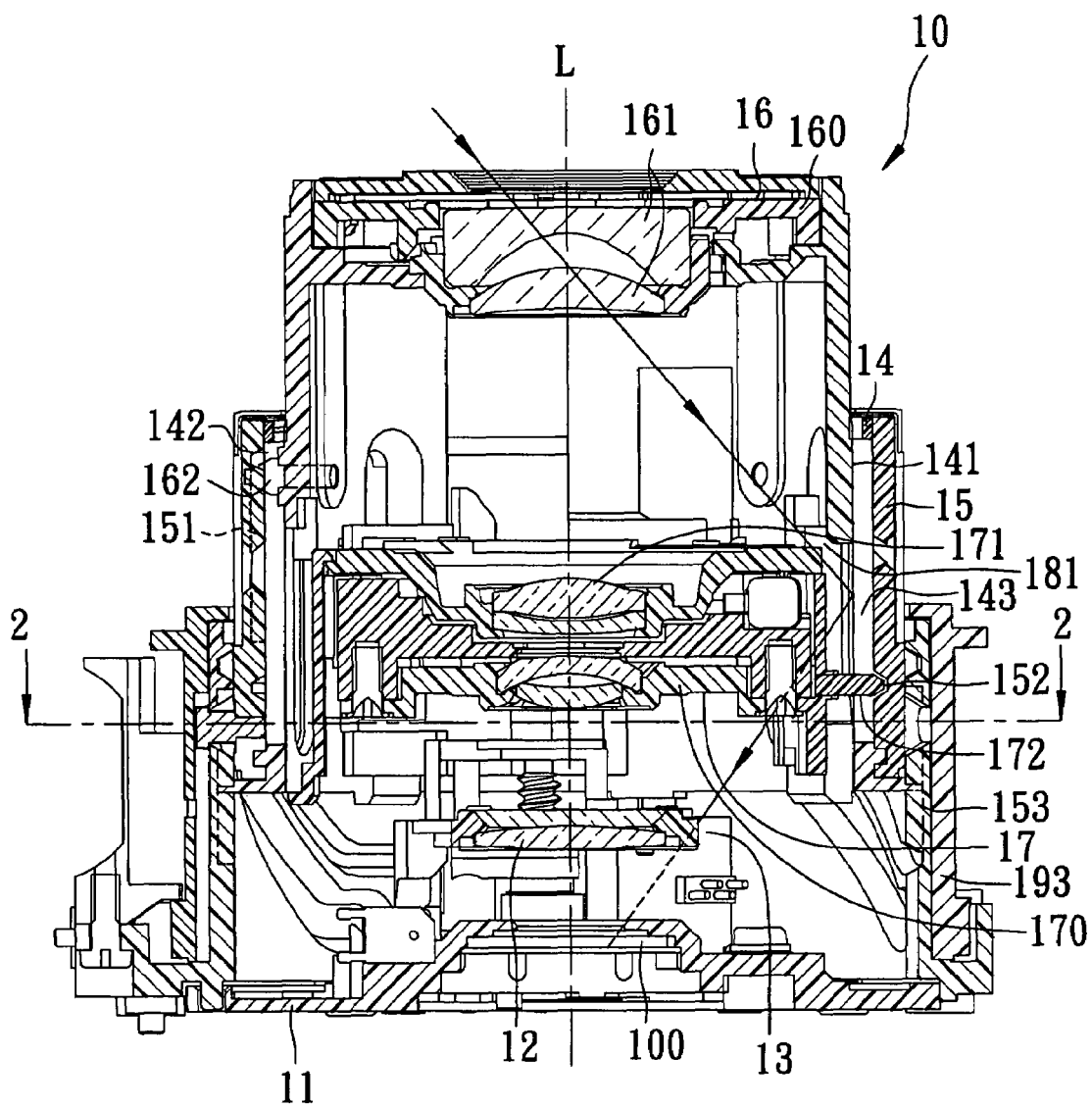
FIG. 1 is an assembled sectional view of a conventional lens device, illustrating how ambient light passes undesirably through first and second gaps.
Figure 2:
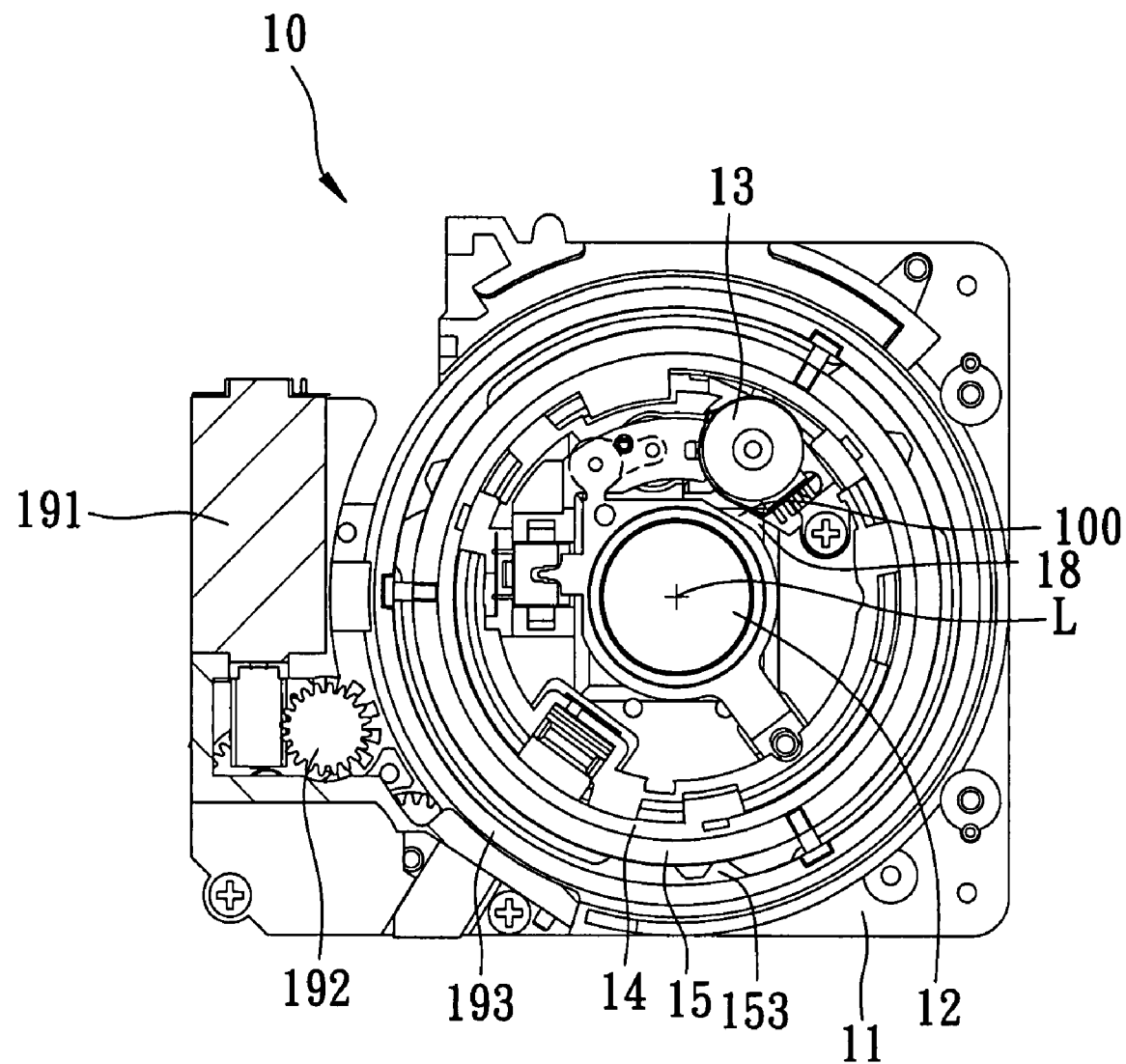
FIG. 2 is a schematic top view of the conventional lens device taken along line 2-2 in FIG. 1.
Figure 3:
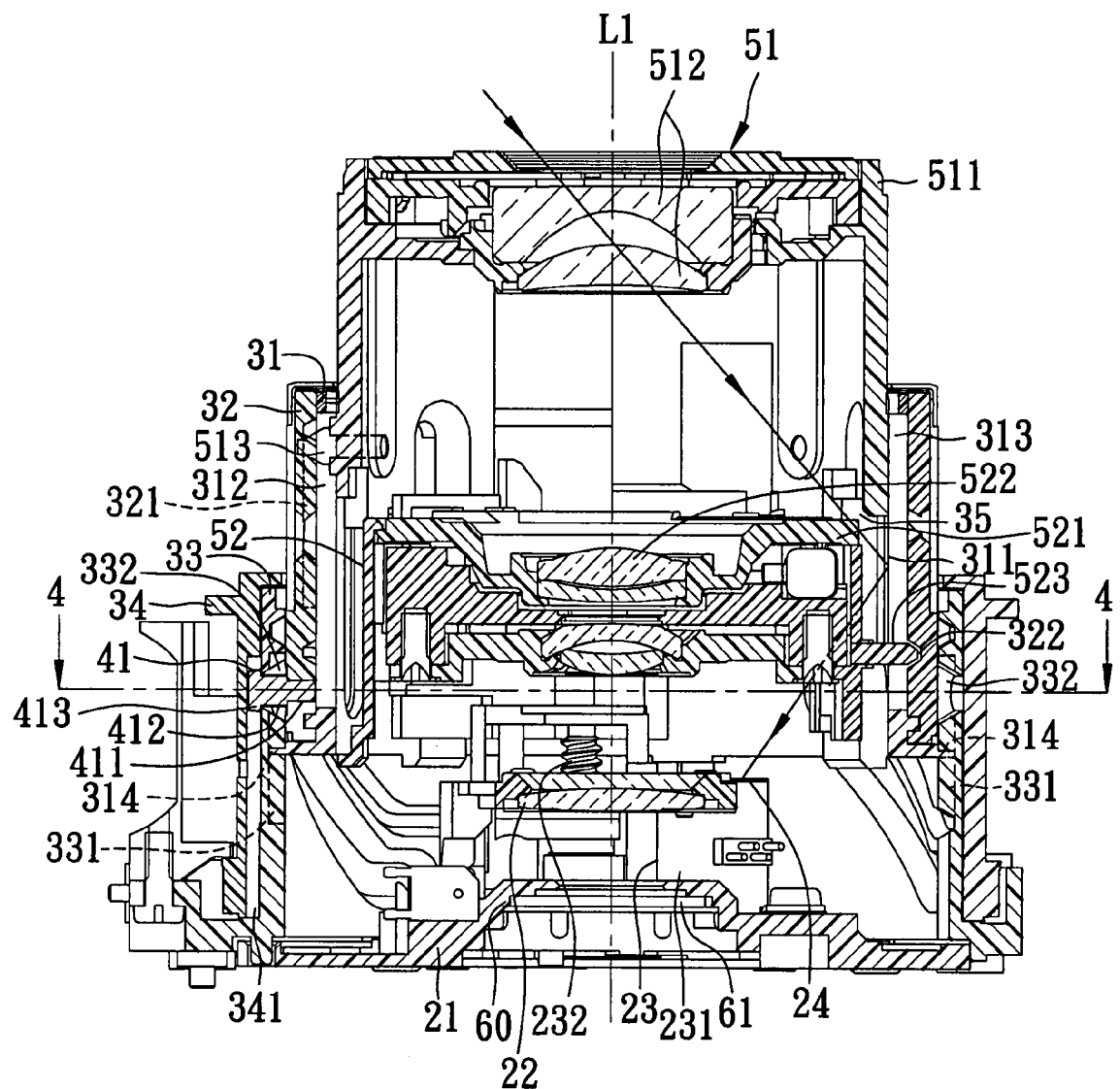
FIG. 3 is an assembled sectional view of a preferred embodiment of a lens device according to the invention, illustrating how a light blocking sheet can function to block ambient light.
Figure 4:
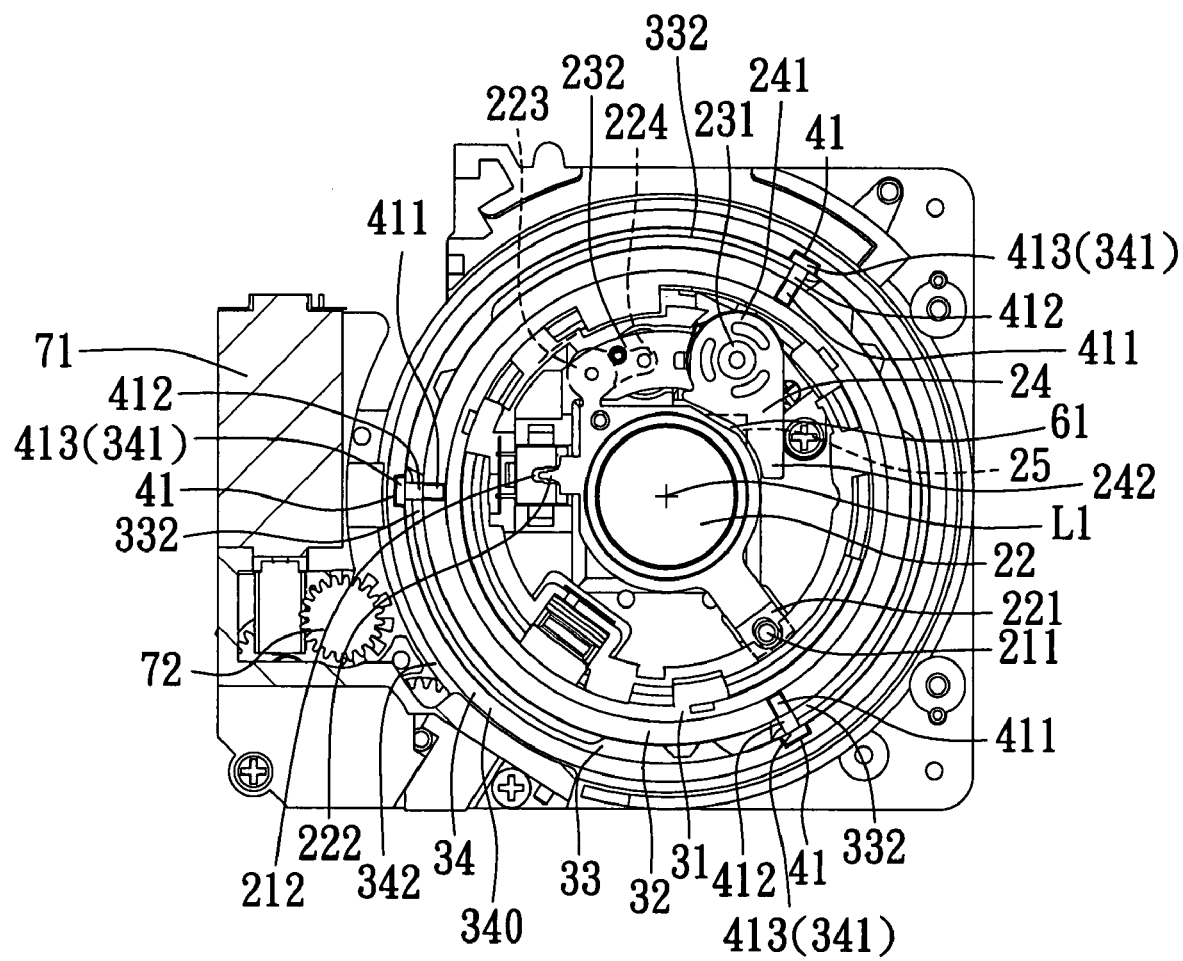
FIG. 4 is a schematic top view of the preferred embodiment taken along line 4-4 in FIG. 3.
Figure 5:
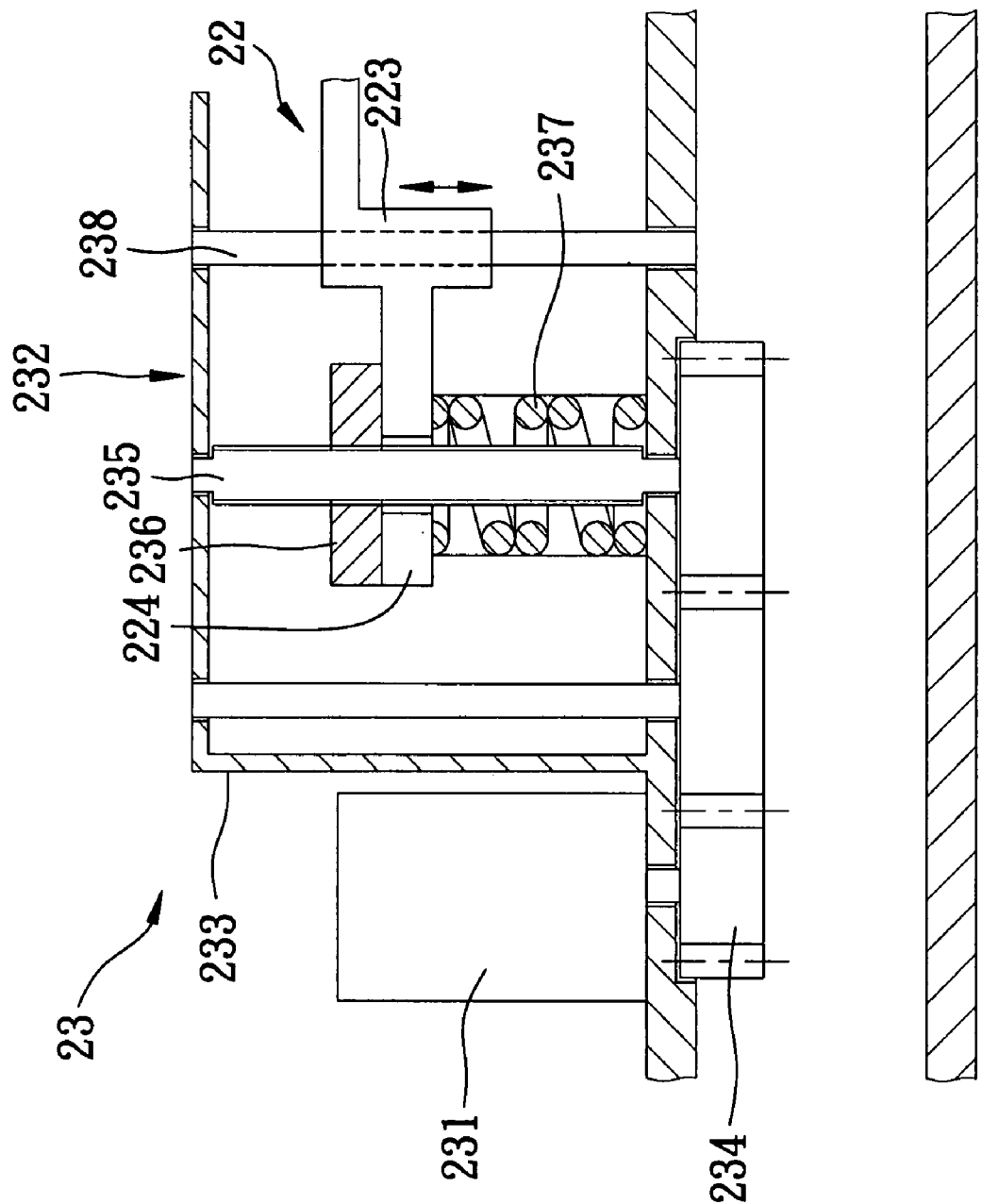
FIG. 5 is a schematic side view of a focus driving unit of the preferred embodiment.

A lens device according to the present invention is adapted for use with an image sensing device, such as a digital camera in the preferred embodiment. As shown in FIGS. 3 to 5, the preferred embodiment of the lens device comprises a base 21, a focus lens unit 22, a focus driving unit 23, a light blocking sheet 24, a main barrel 31, first and second cam barrels 32, 33, a rotary drive barrel 34, three coupling pins 41, and first and second lens units 51, 52.

The base 21 has a light sensing region 60, a guide pin 211, and a guide groove 212. The focus lens unit 22 is mounted movably to the base 21 and is aligned with the light sensing region 60 along an axis (L1). In this embodiment, the base 21 has an image sensing component 61 disposed at the light sensing region 60. The focus lens unit 22 includes a slide lug 221 coupled slidably to the guide pin 211 of the base 21, a slide pin 222 retained slidably in the guide groove 212 in the base 21, a guide barrel 223, and a driven piece 224.

The focus driving unit 23 is mounted to the base 21, is coupled to the focus lens unit 22, is operable to drive the focus lens unit 22 to move along the axis (L1), and includes a focus driving motor 231 and a transmission unit 232 driven by the focus driving motor 231 for driving movement of the focus lens unit 22. The focus driving motor 231 cooperates with the focus lens unit 22 to form a first gap 25 therebetween (see FIG. 4). The transmission unit 232 includes a mounting frame 233, a guide rod 238, a gear set 234, a threaded rod 235, a nut 236, and a spring 237. The guide rod 238 is mounted to the mounting frame 233, extends parallel to the axis (L1), and is coupled to the focus lens unit 22 such that the focus lens unit 22 is slidable therealong. The gear set 234 is driven by the focus driving motor 231. The threaded rod 235 is mounted rotatably to the mounting frame 233, extends parallel to the axis (L1), and is driven rotatably by the gear set 234. The nut 236 is mounted threadedly on the threaded rod 235 and abuts against the focus lens unit 22. The spring 237 is for biasing the focus lens unit 22 toward the nut 236. In this embodiment, the guide barrel 223 of the focus lens unit 22 is sleeved movably on the guide rod 238. The spring 237 is sleeved on the threaded rod 235. The driven piece 224 of the focus lens unit 22 is clamped between the nut 236 and the spring 237.

The light blocking sheet 24 has a connecting portion 241 connected to the focus driving motor 231 of the focus driving unit 23, and a blocking portion 242. The light blocking sheet 24 is made of a resilient material. In this embodiment, the resilient material is one available from SOMARU of Japan, and includes polyester and carbon black.

The main barrel 31 is connected to the second cam barrel 33 that is secured to the base 21, and has an inner annular surface 311 disposed to surround the axis (L1), three first guide slots 312 (only one is shown) each extending parallel to the axis (L1), and three second guide slots 313 (only one is shown) each extending parallel to the axis (L1). The first cam barrel 32 is sleeved rotatably on the main barrel 31, is movable together with the main barrel 31 along the axis (L1), and is formed with three first cam slots 321 (only one is shown) each extending circumferentially around the axis (L1), and three second cam slots 322 (only one is shown) each extending circumferentially around the axis (L1). Each of the first and second guide slots 312, 313 is disposed to correspond in position to a respective one of the first and second cam slots 321, 322. The second cam barrel 33 is sleeved on the first cam barrel 32, and has three third guide slots 331 (only two are shown in FIG. 3) each extending parallel to the axis (L1), and three third cam slots 332 each extending circumferentially around the axis (L1). The lens device further comprises three retaining pins 314 (only two are shown in FIG. 3) provided on the main barrel 31, disposed adjacent to one end of the first cam barrel 32, and retained slidably and respectively in the third guide slots 331.

The rotary drive barrel 34 is sleeved rotatably on the second cam barrel 33, and has a periphery 340, three retaining slots 341 disposed to correspond respectively in position to the third cam slots 332, and a plurality of teeth 342 formed at the periphery 340.

Each of the coupling pins 41 extends radially from the first cam barrel 32 through the second cam barrel 33 to the rotary drive barrel 34, and includes a connecting part 411 that is connected to the first cam barrel 32, a guide part 412 that extends from the connecting part 411 and that is slidable along a respective one of the third cam slots 332 in the second cam barrel 33, and a head part 413 that extends from the guide part 412 and that is retained slidably in a respective one of the retaining slots 341 in the rotary drive barrel 34.

The first lens unit 51 is disposed in the main barrel 31, is movable along the axis (L1), and includes a first lens frame 511 and a plurality of first lenses 512 that are secured in the first lens frame 511 and that correspond in position to the focus lens unit 22. The first lens unit 51 further includes three first connecting pins 513 (only one is shown) connected to the first lens frame 511, extending respectively through the first guide slots 312 in the main barrel 31, and retained slidably and respectively in the first cam slots 321 in the first cam barrel 32.

The second lens unit 52 is disposed in the main barrel 31, is movable along the axis (L1), and includes a second lens frame 521 and a plurality of second lenses 522 that are secured in the second lens frame 521 and that correspond in position to the first lenses 512. The second lens unit 52 further includes three second connecting pins 523 (only one is shown) connected to the second lens frame 521, extending respectively through the second guide slots 313 in the main barrel 31, and retained slidably and respectively in the second cam slots 322 in the first cam barrel 32.

Figure 6:
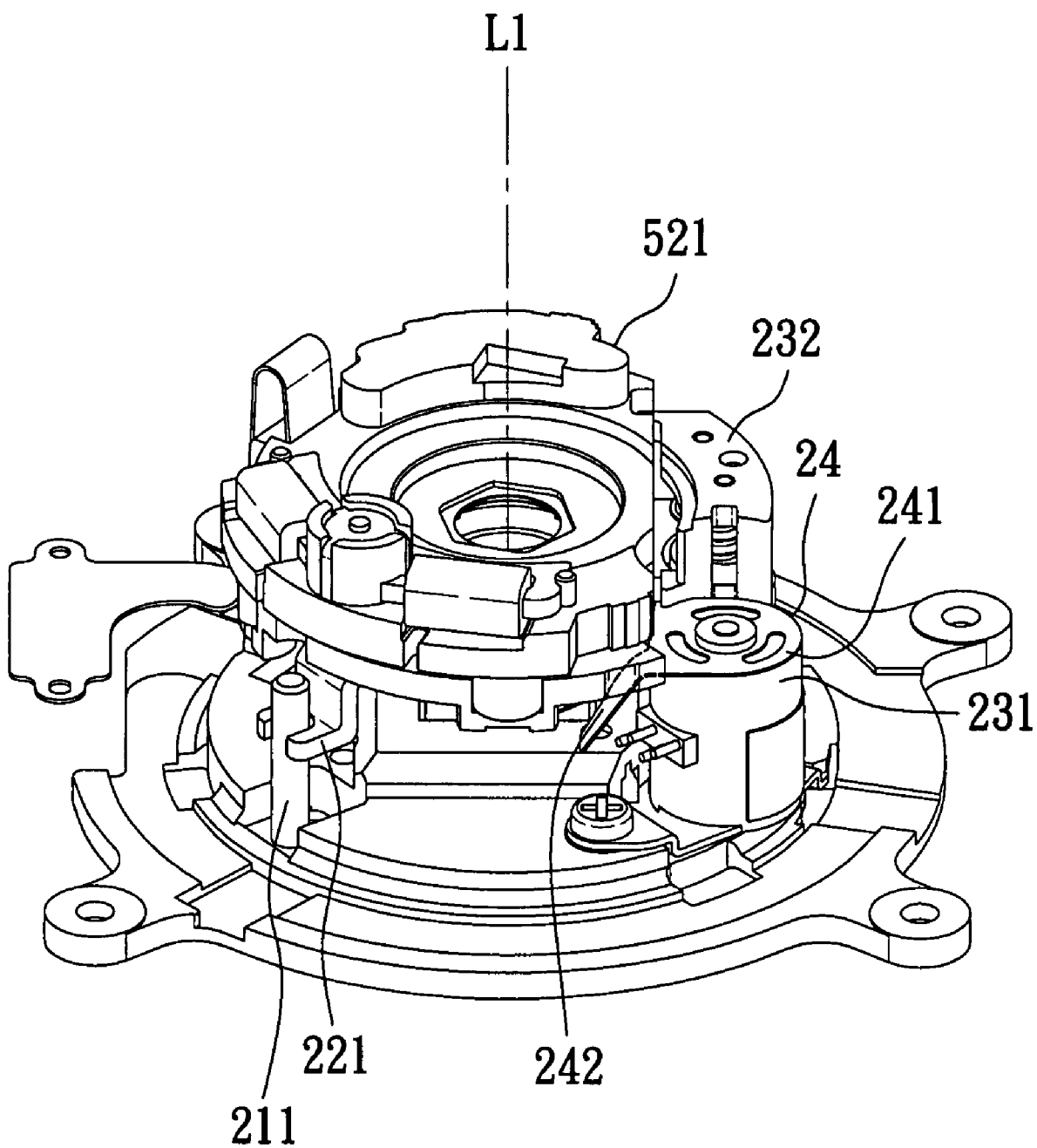
FIG. 6 is a fragmentary assembled perspective view of the preferred embodiment, illustrating how the light blocking sheet is pressed to flex when a second lens unit is at a retracted position.
Figure 7:
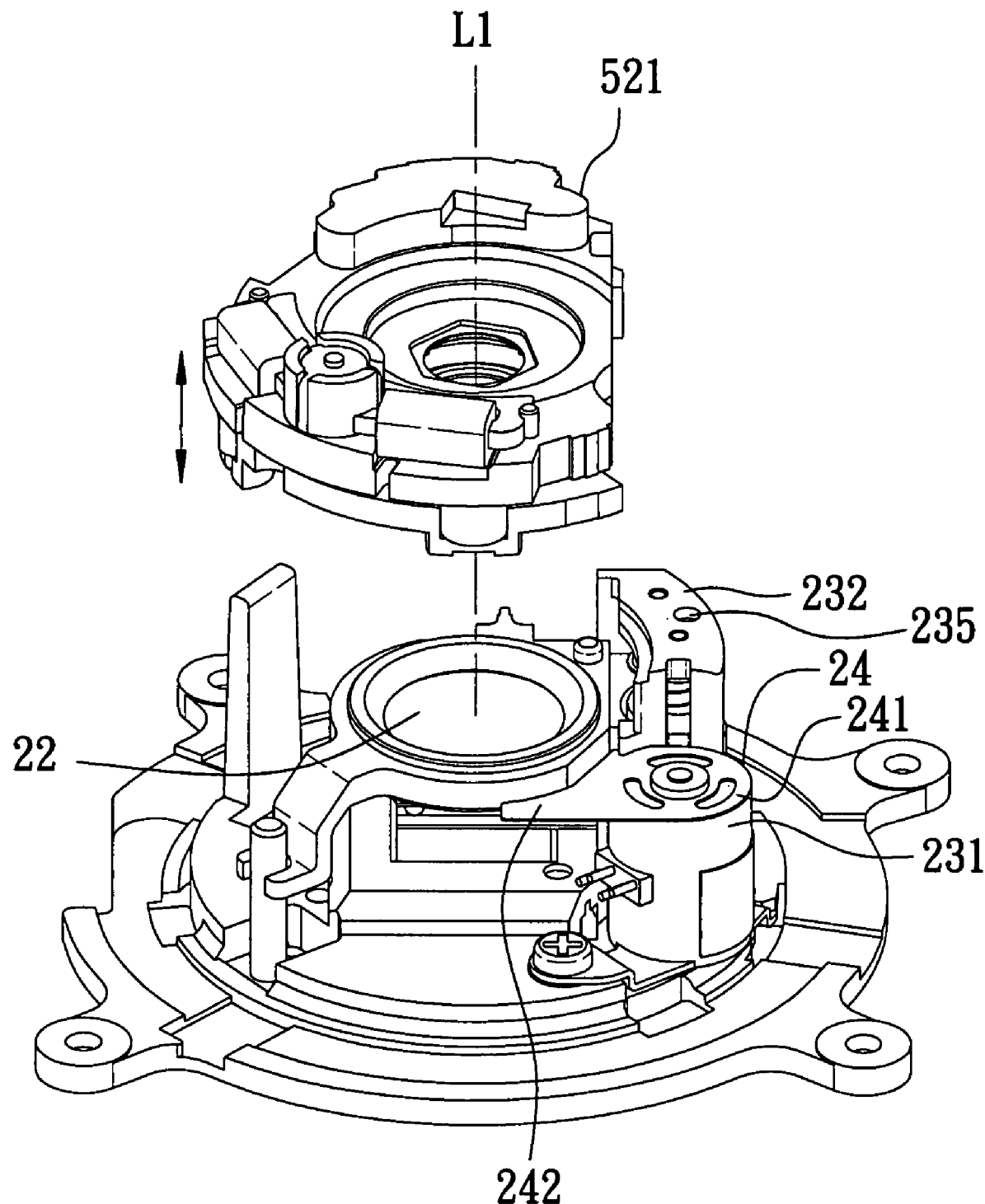
FIG. 7 is a view similar to FIG. 6, but illustrating the light blocking sheet spanning a first gap when the second lens unit is at an extended position.

The first and second lens units 51, 52 are movable in the main barrel 31 along the axis (L1) between an extended position (see FIGS. 3 and 7), where the first and second lens units 51, 52 cooperatively define a second gap 35 therebetween, through which light passes and is reflected by the inner annular surface 311 of the main barrel 31 toward the first gap 25 and the light sensing component 61 at the light sensing region 60 of the base 21, and a retracted position (see FIG. 6), where the second lens frame 521 extends into the first gap 25.

When the digital camera is turned on, a motor 71 that engages a gear set 72 will drive the rotary drive barrel 34 through the teeth 342 of the rotary drive barrel 34 to rotate about the axis (L1). The coupling pins 41 that extend to the rotary drive barrel 34 will also move with the rotary drive barrel 34 to drive movement of the first cam barrel 32 along the axis (L1) in a direction away from the second cam barrel 33. The main barrel 31 that is rotatably coupled to the first cam barrel 32 will hence move with the first cam barrel 32. Since the first connecting pins 513 extend respectively through the first guide slots 312 in the main barrel 31 and are retained slidably and respectively in the first cam slots 321 in the first cam barrel 32, and since the second connecting pins 523 extend respectively through the second guide slots 313 in the main barrel 31 and are retained slidably and respectively in the second cam slots 322 in the first cam barrel 32, the first and second lens units 51, 52 will move with the main barrel 31 in a direction away from the focus lens unit 22 and the image sensing component 61 to the extended position, where the blocking portion 242 of the light blocking sheet 24 spans the first gap 25 so as to prevent the light reflected by the inner annular surface 311 of the main barrel 31 from reaching the image sensing component 61 via the first gap 25.

After the start-up process, an automatic focus control system (not shown) of the digital camera will drive the focus driving motor 231 of the focus driving unit 23 to rotate, thereby driving the threaded rod 235 of the transmission unit 232 of the focus driving unit 23 to rotate through the gear set 234 of the transmission unit 232. The threaded rod 235 will then drive the focus lens unit 22 to move toward or away from the image sensing component 61 at the light sensing region 60 of the base 21, thereby resulting in focus adjustment.

On the contrary, when the digital camera is turned off, the motor 71 and the gear set 72 will drive the rotary drive barrel 34 through the teeth 342 to rotate in an opposite direction, and the first and second lens units 51, 52 will move with the main barrel 31 toward the focus lens unit 22 and the image sensing component 61 to the retracted position, where the light blocking sheet 24 is pressed by the second lens frame 521 of the second lens unit 52 to flex.

Due to the light blocking sheet 24 that prevents the light reflected by the inner annular surface 311 of the main barrel 31 from reaching the image sensing component 61 via the first gap 25, the quality of captured images can be improved without a substantial increase in production costs. Moreover, since the light blocking sheet 24 is resilient, it flexes to make room for receiving the second lens frame 521 of the second lens unit 52 while the second lens unit 52 is at the retracted position, thereby reducing effectively the minimum required thickness of the lens device.

It should be noted that, while this invention is exemplified using three first guide slots 312, three second guide slots 313, three third guide slots 331, three first cam slots 321, three second cam slots 322, three third cam slots 332, three first connecting pins 513, three second connecting pins 523, three retaining pins 314, three retaining slots 341, and three coupling pins 41, only one first guide slot 312, one second guide slot 313, one third guide slot 331, one first cam slot 321, one second cam slot 322, one third cam slot 332, one first connecting pin 513, one second connecting pin 523, one retaining pin 314, one retaining slot 341, and one coupling pin 41 may be employed in other embodiments of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens device comprising:
    a base;
    a focus lens unit mounted movably to said base;
    a focus driving unit mounted to said base, coupled to said focus lens unit, operable to drive said focus lens unit to move along an axis, and cooperating with said focus lens unit to form a first gap therebetween;
    a main barrel connected to said base and having an inner annular surface;
    a first lens unit disposed movably in said main barrel, and including a first lens frame and a first lens that is secured in said first lens frame and that corresponds in position to said focus lens unit;
    a second lens unit disposed movably in said main barrel, and including a second lens frame and a second lens that is secured in said second lens frame and that corresponds in position to said first lens;
    said first and second lens units being movable in said main barrel along the axis between an extended position, where said first and second lens units cooperatively define a second gap therebetween, through which light passes and is reflected by said inner annular surface of said main barrel toward said first gap, and a retracted position, where said second lens frame extends into said first gap; and
    a light blocking sheet made of a resilient material, and having a connecting portion that is connected to said focus driving unit, and a blocking portion that is disposed to span said first gap when said first and second lens units are at the extended position so as to block passage of the light reflected by said inner annular surface of said main barrel through said first gap, and that is capable of flexing when pressed by said second lens frame during movement of said first and second lens units to the retracted position.

2. The lens device as claimed in claim 1, wherein said focus driving unit includes a focus drive motor connected to said connecting portion of said light blocking sheet, and a transmission unit driven by said focus drive motor for driving movement of said focus lens unit,
    wherein said transmission unit includes
        a mounting frame,
        a guide rod mounted to said mounting frame, extending parallel to the axis, and coupled to said focus lens unit such that said focus lens unit is slidable therealong,
        a gear set driven by said focus drive motor,
        a threaded rod mounted rotatably to said mounting frame, extending parallel to said guide rod, and driven rotatably by said gear set,
        a nut mounted threadedly on said threaded rod and abutting against said focus lens unit, and
        a spring for biasing said focus lens unit toward said nut.

3. The lens device as claimed in claim 2, wherein said first gap is formed between said focus drive motor of said focus driving unit and said focus lens unit.

4. The lens device as claimed in claim 1, further comprising a first cam barrel sleeved rotatably on said main barrel, movable together with said main barrel along the axis, and formed with first and second cam slots each extending circumferentially around the axis,
    said main barrel further having first and second guide slots each extending parallel to the axis and each disposed to correspond in position to a respective one of said first and second cam slots,
    said first lens unit further including a first connecting pin that is connected to said first lens frame, that extends through said first guide slot in said main barrel, and that is retained slidably in said first cam slot in said first cam barrel, and
    said second lens unit further including a second connecting pin that is connected to said second lens frame, that extends through said second guide slot in said main barrel, and that is retained slidably in said second cam slot in said first cam barrel.

5. The lens device as claimed in claim 4, further comprising:
- a second cam barrel secured to said base, sleeved on said first cam barrel, and having a third guide slot that extends parallel to the axis and a third cam slot that extends circumferentially around the axis;
- a retaining pin provided on said main barrel, disposed adjacent to one end of said first cam barrel, and retained slidably in said third guide slot;
- a rotary drive barrel sleeved rotatably on said second cam barrel and formed with a retaining slot that is disposed to correspond in position to said third cam slot; and
- a coupling pin extending radially from said first cam barrel through said second cam barrel to said rotary drive barrel, and including a connecting part that is connected to said first cam barrel, a guide part that extends from said connecting part and that is slidable along said third cam slot in said second cam barrel, and a head part that extends from said guide part and that is retained slidably in said retaining slot in said rotary drive barrel.

6. The lens device as claimed in claim 5, wherein:
said main barrel has three of said first guide slots and three of said second guide slots,
said first cam barrel is formed with three of said first cam slots and three of said second cam slots,
said second cam barrel has three of said third guide slots and three of said third cam slots,
said first lens unit includes three of said first connecting pins,
said second lens unit includes three of said second connecting pins,
said rotary drive barrel is formed with three of said retaining slots, and
said lens device comprises three of said retaining pins and three of said coupling pins.

7. The lens device as claimed in claim 1, wherein the resilient material includes polyester and carbon black.

8. The lens device as claimed in claim 1, wherein said base has an image sensing component disposed thereon and corresponding in position to said focus lens unit.

9. A lens device comprising:
- a base;
- a focus lens unit mounted movably to said base;
- a focus driving unit mounted to said base, coupled to said focus lens unit, operable to drive said focus lens unit to move along an axis, and cooperating with said focus lens unit to form a gap therebetween;
- a main barrel connected to said base;
- a movable lens unit disposed movably in said main barrel, and including a lens frame and a lens that is secured in said lens frame and that corresponds in position to said focus lens unit, said movable lens unit being movable along the axis between an extended position, and a retracted position, where said lens frame extends into said gap; and
- a light blocking sheet made of a resilient material, and having a connecting portion that is connected to said focus driving unit, and a blocking portion that is disposed to span said gap when said movable lens unit is at the extended position, and that is capable of flexing when pressed by said lens frame during movement of said movable lens unit to the retracted position.

* * * * *